(12) United States Patent
Münch et al.

(10) Patent No.: US 12,049,422 B2
(45) Date of Patent: Jul. 30, 2024

(54) METHOD FOR COOLING A SPACE AROUND A SLEEVE SHAFT, DEVICE FOR GUIDING A FLUID ALONG AN OUTER SURFACE AREA OF A SLEEVE SHAFT, SLEEVE SHAFT COMPRISING SUCH A DEVICE, REFRACTORY TUBE WITH SUCH A SLEEVE SHAFT INSERTED AND SYSTEM COMPRISING SUCH A SLEEVE SHAFT AND/OR SUCH A REFRACTORY TUBE

(71) Applicant: Schott AG, Mainz (DE)

(72) Inventors: Wolfgang Münch, Bubenheim (DE); Roland Fuchs, Mitterteich (DE); Gregor Rösel, Ginsheim-Gustavsburg (DE)

(73) Assignee: Schott AG, Mainz (DE)

( * ) Notice: Subject to any disclaimer, the term of this patent is extended or adjusted under 35 U.S.C. 154(b) by 235 days.

(21) Appl. No.: 17/360,675

(22) Filed: Jun. 28, 2021

(65) Prior Publication Data

US 2021/0403361 A1 Dec. 30, 2021

(30) Foreign Application Priority Data

Jun. 29, 2020 (EP) .................................... 20182894

(51) Int. Cl.
*C03B 17/04* (2006.01)
*C03B 7/094* (2006.01)

(52) U.S. Cl.
CPC .............. *C03B 7/094* (2013.01); *C03B 17/04* (2013.01)

(58) Field of Classification Search
CPC ...................................................... C03B 17/04
See application file for complete search history.

(56) References Cited

U.S. PATENT DOCUMENTS

| 3,364,004 A | 1/1968 | Cozine et al. |
| 2006/0260360 A1* | 11/2006 | Dick ....................... C03C 17/22 65/60.53 |

FOREIGN PATENT DOCUMENTS

| BE | 493542 | 5/1950 | |
| DE | 454877 | 1/1928 | |
| DE | 29800426 U1 * | 6/1998 | ............. B22D 17/24 |
| DE | 10 2017 210 682 A1 | 12/2018 | |

OTHER PUBLICATIONS

DE 29800426 U1 (Watermann) Jan. 1, 1998 (English language machine translation). [online] [retrieved Apr. 14, 2023]. Retrieved from: Espacenet. (Year: 1998).*
European Search Report dated Nov. 26, 2020 for European Patent Application No. 20182894.4 (4 pages).
European Communication pursuant to Article 94(3) EPC dated Feb. 2, 2021 for European Patent Application No. 20 182 894.4 (6 pages).

* cited by examiner

*Primary Examiner* — Erin Snelting
(74) *Attorney, Agent, or Firm* — Taylor IP, P.C.

(57) ABSTRACT

The present invention relates to a method for cooling a space around a sleeve shaft, a device for guiding a fluid along an outer surface area of a sleeve shaft, a sleeve shaft including such a device, and a refractory tube with such a sleeve shaft inserted. The present invention also relates to a system including such a device, which system may also include such a sleeve shaft and such a refractory tube.

20 Claims, 2 Drawing Sheets

METHOD FOR COOLING A SPACE AROUND A SLEEVE SHAFT, DEVICE FOR GUIDING A FLUID ALONG AN OUTER SURFACE AREA OF A SLEEVE SHAFT, SLEEVE SHAFT COMPRISING SUCH A DEVICE, REFRACTORY TUBE WITH SUCH A SLEEVE SHAFT INSERTED AND SYSTEM COMPRISING SUCH A SLEEVE SHAFT AND/OR SUCH A REFRACTORY TUBE

CROSS REFERENCE TO RELATED APPLICATIONS

This application claims priority to European Patent Application EP 20182894.4 filed on Jun. 29, 2020, which is incorporated in its entirety herein by reference.

BACKGROUND OF THE INVENTION

1. Field of the Invention

The present invention relates to a method for cooling a space around a sleeve shaft, a device for guiding a fluid along an outer surface area of a sleeve shaft, a sleeve shaft comprising such a device, and a refractory tube with such a sleeve shaft inserted. The present invention also relates to a system comprising such a sleeve shaft and/or such a refractory tube.

2. Description of the Related Art

In the state of the art for a mechanical glass tube drawing process, such as the Danner process, a carrier is used which carries a refractory tube and both, the carrier and the refractory tube, are connected to each other in a non-rotating manner. The refractory tube in turn provides a surface area onto which molten glass runs which molten glass then is shaped into a glass tube in the shaping zone arranged at one end of the refractory tube. During the drawing process, the carrier performs a rotational movement, and so does the refractory tube.

The carrier in this regard might be in the form of a sleeve shaft, which often is, for example, a hollow shaft made of steel.

Depending on the process, the refractory tube has temperatures of, for example, 1100 degrees C. to 1200 degrees C. due to the molten glass running on its surface area.

However, in conventional glass drawing processes it has been observed that the geometric parameters, hence, the quality, of the glass tube line can still be improved. For example, the uniformity of the thickness of the wall of the glass tube might be subject to improvements or at least subject to a better control.

SUMMARY OF THE INVENTION

Exemplary embodiments provided according to the present invention provide methods and ways which allow an easy and cost-efficient manner of producing a glass tube of improved quality. Exemplary embodiments provided according to the present invention also provide sleeve shafts, refractory tubes, and systems which overcome the known disadvantages.

In some exemplary embodiments provided according to the present invention, a system includes a device for guiding a fluid along an outer surface area of a sleeve shaft which is used as a carrier for a refractory tube, on which refractory tube during a glass tube drawing process molten glass runs onto a surface area of the refractory tube. The device is or can be arranged at least area by area at least one of on the sleeve shaft or in the refractory tube in a non-rotating manner. The device includes: an outer wall, which, when the device is mounted on the sleeve shaft, has at least area by area a radial distance from the outer surface area of the sleeve shaft and limits a volume domain enclosed between the outer wall and the outer surface area of the sleeve shaft at least in part radially outwards; and a dividing element arranged at least in part within the volume domain, which divides the volume domain into a plurality of volume part domains, which volume part domains are at least in part at least one of pairwise or area by area fluidly connected to each other within the volume domain.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
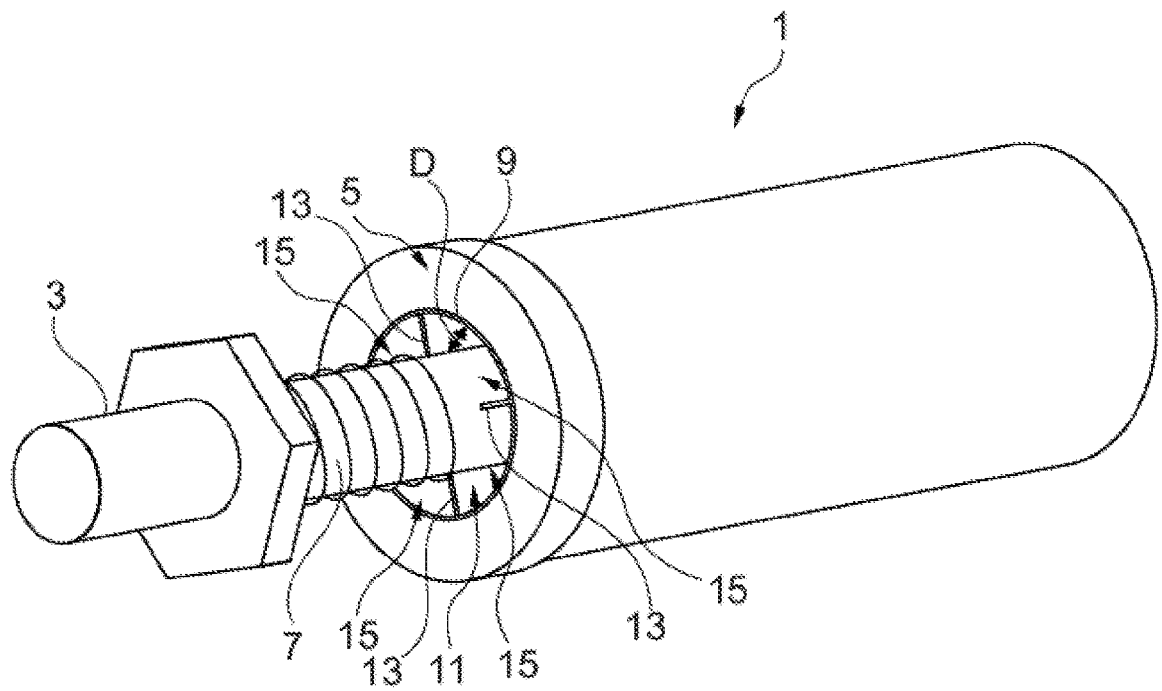
FIG. 1 illustrates a perspective partial cut view of an exemplary embodiment of a refractory tube with a sleeve shaft and a device, respectively, provided according to the present invention.

Exemplary embodiments provided according to the present invention provide a method for cooling a space around a sleeve shaft which is used as carrier for a refractory tube, on which refractory tube during a glass tube drawing process molten glass runs onto at least one surface area of the refractory tube, from at least one fluid outlet which is at a fixed position with respect to at least one rotating assembly, the assembly comprising the refractory tube and the sleeve shaft connected to the refractory tube in a non-rotating manner, at least one fluid flow is emitted in the direction towards at least one volume domain, which volume domain is enclosed at least in part between at least one outer surface area of the sleeve shaft and at least one inner surface area of the refractory tube and is provided in a non-rotating manner with the sleeve shaft, the volume domain is divided into a plurality of volume part domains, which volume part domains are at least in part pairwise and/or area by area fluidly connected to each other within the volume domain, and an alternating fluid flow within the volume domain or parts thereof is created in that at least one part of the fluid flow emitted by the fluid outlet is injected sequentially in different volume part domains as a result of the rotation of the assembly.

Exemplary embodiments provided according to the present invention are, thus, based on the surprising finding that by establishing within a defined volume domain enclosed between the refractory tube and the sleeve shaft a controlled forced convection, such as along the outer surface of the sleeve shaft, having flow directions that are changing in a spatial and/or temporal manner, it is possible to support the dissipation of energy in an efficient manner. The energy in the form of heat energy dissipates away from the space between the sleeve shaft and the refractory tube. Hence, a cooling effect of the air in that space is provided. It turned out that this cooling effect also leads to cooling of the refractory tube. It is an astonishing finding that with the accompanying reduction of the temperature of the refractory tube, the glass tube drawing process can be conducted in a manner which allows obtaining a significantly improved glass tube.

While there is no strict scientific theory to explain this phenomenon, it is assumed that the reduced temperature of the refractory tube achieved in this manner leads to a favorable interaction between the initial hot glass material with the cooled refractory tube, hence, well defined geometric parameters of the glass tube line can be obtained.

Further, it is astonishing that for a fluid a controlled forced convection with different and changing flow directions within the defined volume domain can be achieved in a particularly easy and efficient manner in that the volume domain is partitioned and a fluid flow is emitted sequentially in different parts of the volume domain, which parts are fluidly connected to each other.

In the field of glass drawing, it has been found to be particularly promising that the interplay between a fluid outlet that is fixedly arranged and a rotational movement of the volume domain is employed for realizing the condition that the fluid is sequentially emitted in different volume part domains.

Hence, depending on the rotational position of the volume part domains relative to the (at least one) fluid outlet, each volume part domain can be regarded first as functioning as a fluid guiding element where a fluid flow is injected from outside the volume domain and second as functioning as a fluid guiding element where a fluid flow is injected from inside the volume domain (i.e. via the fluid connection). This leads to an alternating (spatial and/or temporal) fluid flow within the volume domain or parts thereof, i.e. forced flow directions that are different spatially and/or temporally.

It may be given that the volume part domains are fluidly connected to each other within the volume domain. This, however, does not exclude that the volume part domains might be also fluidly connected to each other via some connection outside of the volume domain.

In some embodiments, it might alternatively or in addition be provided that the amount of fluid emitted by the fluid outlet is between 20 and 200 l/min, such as between 20 and 100 l/min or between 90 and 200 l/min, and/or is controlled based on the speed of rotation of the assembly and/or on the temperature measured at least in part between the outer surface area of the sleeve shaft and the inner surface area of the refractory tube, and/or wherein the speed of rotation of the assembly is between 10 and 20 rounds per minute, such as between 13 and 17 rounds per minute.

The amount of fluid is an exemplary parameter to control the cooling effect. Typically, a higher amount of fluid leads to an increased cooling effect of the air in the space between the refractory tube and the sleeve shaft, hence to an increased reduction of temperature of the refractory tube.

If the amount of fluid is controlled based on the speed of rotation of the assembly and/or based on the measured temperature, it is possible to keep the temperature of the air within certain boundaries constant on a predefined level. This leads to improved and uniform results of the produced glass tube.

In some exemplary embodiments provided according to the present invention, a device for guiding at least one fluid along at least one outer surface area of a sleeve shaft which is used as a carrier for a refractory tube, on which refractory tube during a glass tube drawing process molten glass runs onto at least one surface area of the refractory tube, the device is or can be arranged at least area by area on the sleeve shaft and/or in the refractory tube in a non-rotating manner. The device includes: at least one outer wall, which, when the device is mounted on the sleeve shaft, has at least area by area at least one radial distance from the outer surface area of the sleeve shaft and limits at least one volume domain enclosed between the outer wall and the outer surface area of the sleeve shaft at least in part radially outwards; and one or more dividing elements arranged at least in part within the volume domain, which divide the volume domain into a plurality of volume part domains, which volume part domains are at least in part pairwise and/or area by area fluidly connected to each other within the volume domain.

Exemplary embodiments provided according to the present invention are, thus, based on the surprising finding that by establishing within a defined volume domain enclosed between the refractory tube and the sleeve shaft a controlled forced convection, such as along the outer surface of the sleeve shaft, with the forced convection having flow directions that are changing in a spatial and temporal manner, it is possible to support the dissipation of energy in an efficient manner. The energy in the form of heat energy dissipates away from the space between the sleeve shaft and the refractory tube. Hence, a cooling effect of the air in that space is provided. It turned out that this cooling effect also leads to a cooling of the refractory tube. It is an astonishing finding that with the accompanying reduction of the temperature of the refractory tube, the glass tube drawing process can be conducted in a manner which allows obtaining a significantly improved glass tube.

While there is no strict scientific theory to explain this phenomenon, it is assumed that the reduced temperature of the refractory tube achieved in this manner leads to a favorable interaction between the initial hot glass material with the cooled refractory tube, hence, well defined geometric parameters of the glass tube can be obtained.

It is astonishing that said advanced fluid flow can be established by incorporating appropriate fluid guiding elements according to the present invention. In this respect, the fluid guiding elements can be easily realized in that an outer wall limits the volume domain in a radial direction and one or more dividing elements are used to build the volume part domains. In order to obtain a spatial and/or temporal change of the flow directions, it has been found that it is sufficient that at least some of the single volume part domains are fluidly connected to each other within the volume domain.

Hence, each volume part domain provided by the device can be used first as a fluid guiding element where a fluid flow is injected from outside the volume domain and second as a fluid guiding element where a fluid flow is injected from inside the volume domain (i.e. via the fluid connection). If fluid is sequentially emitted in different volume part domains, this leads to an alternating (spatial and/or temporal) fluid flow within the volume domain or parts thereof, i.e. forced flow directions that are different spatially and/or temporally.

The device can be realized in an easy and robust manner.

It may be provided that the volume part domains are fluidly connected to each other within the volume domain. This, however, does not exclude that the volume part domains might be also fluidly connected to each other via some connection outside of the volume domain.

It may be provided that the radial and/or axial direction describes a radial or axial direction when the device is mounted on the sleeve shaft. I.e. the radial or axial direction is or can be determined if the device is mounted on the sleeve shaft. This definition especially applies to the radial direction in the term that the volume domain is limited radially outwards.

In some embodiments, the device provided according to the present invention might be used in combination with the method provided according to the present invention.

In some embodiments, it might alternatively or in addition be provided that the outer wall is designed in one piece and/or the outer wall is at least in part of hollow cylindrical shape, and/or that the outer wall is built by a plurality of outer wall parts, which may be entirely or at least in part separated from each other when the device is mounted at the sleeve shaft, wherein each of the outer wall parts may limit one or more of the volume part domains at least in part radially outward.

A single-piece outer wall is easy to fabricate and easy to handle.

If the outer wall has a cylindrical shape, it can be arranged within the space between the sleeve shaft and the refractory tube because many components also have a cylindrical shape. Furthermore, a cylindrical shape of the outer wall prevents introduction of imbalances during rotation of the sleeve shaft (when the device is attached thereto).

If the outer wall is built by a plurality of outer wall parts, it is easier to arrange the wall at the sleeve shaft, because outer wall parts can be arranged one after another on the sleeve shaft. Furthermore, storage of the device might be easier if the outer wall has multiple parts.

It is possible in some embodiments that the outer wall parts are separated in the mounted state, as long as the fluid connection is properly working. This way, no small tolerances during mounting need to be met. This simplifies mounting of the device.

If each volume part domain has its own outer wall part it might also be possible to choose a specific number of volume part domains by arranging a respective number of outer wall parts.

In some embodiments, it might alternatively or in addition be provided that the device is designed in a modular manner, wherein a plurality of modules may be arranged on the sleeve shaft next to one another around at least one part of the outer circumference of the sleeve shaft when the device is mounted at the sleeve shaft and/or each outer wall part is comprised by at least one of the modules, wherein at least one of the dividing elements may be built by at least one wall portion of at least one module, such as the dividing element is built by the two neighboring wall portions of two adjacent modules, and/or the wall portion(s) extend(s) in an axial and/or radial direction within the volume domain.

A modular device allows easy arrangement of the device at the sleeve shaft because each module can be arranged one after another at the sleeve shaft.

The setup of the device is particularly simplified if the dividing element is inherently provided by a wall portion of the module (or two wall portions of two adjacent modules).

For example, in some embodiments each module might be designed in the general form of a "box" having a top wall (e.g. the outer wall) a back wall and one or two side walls (i.e. the wall portions). Once arranged at the sleeve shaft, there is a volume part domain enclosed between the top wall, the back wall, the side walls and the outer surface area of the sleeve shaft. The two side walls limiting the volume domain can belong either to the same module (i.e. each module has two side walls) or to two adjacent modules (i.e. each module has one side wall).

If the wall portions extend in an axial and/or radial direction within the volume domain a volume part domain with a particularly good volume geometry can be achieved with respect to the fluid flow.

In some embodiments, it might alternatively or in addition be provided that the dividing element comprises at least one metal sheet which is arranged at least in part within the volume domain, wherein the metal sheet can extend in an axial and/or radial direction within the volume domain, and/or that the dividing element extends into the volume domain from the inner circumferential side of the outer wall, the dividing element has an angle of about 90 degrees with the outer wall, the dividing element is designed in one piece with the outer wall and/or the dividing element is arranged on the outer surface area of the sleeve shaft when the device is mounted on the sleeve shaft.

A metal sheet can be provided in a particularly easy manner. It is also possible in an easy way to provide the metal sheet in different shapes.

If the dividing element is in one piece with the outer wall, a particularly robust design of the device is possible.

With an angle of about 90 degrees, a volume part domain of particular good volume geometry can be achieved with respect to the fluid flow.

If the dividing element is arranged on the outer surface area of the sleeve shaft when the device is mounted on the sleeve shaft, the fluid flowing within the individual volume part domains does not adversely affect each other. In other words, the "leakage" of the fluid flow is reduced or even prevented.

In some embodiments, it might alternatively or in addition be provided that the dividing element is at least area by area reduced in axial and/or radial extension, such as in at least one first end section of the device, such that within the volume domain at least one fluid overflow area for the fluid is provided so that the fluid can flow from at least one first volume part domain to at least one second volume part domain.

The fluid connection between pairs of volume part domains can be particularly easy and efficient realized in that the dividing element provides some opening within the volume domain which allows the fluid to flow from one volume part domain to the other within the volume domain.

If the fluid overflow area is provided at the first end section of the device, the fluid can flow the maximal distance from entering the volume part domain (e.g. at the other opposing end section of the device) to the fluid overflow area. This allows for a particularly efficient fluid flow dynamic within the volume domain and the volume part domains.

In some embodiments, the term "reduced in axial direction" means a reduction compared to the respective extension of the volume domain.

In some embodiments, the term "reduced in radial direction" means a reduction compared to the respective extension of the volume domain.

In some embodiments, it might alternatively or in addition be provided that the device comprises two, three, four, five or more dividing elements, which are arranged along the inner circumference of the outer wall in equal distant angles, such as the device comprises four dividing elements which are arranged at distances of about 90 degrees to one another around the inner circumference.

The term "equal distant angles" here may mean that in a cross-sectional plane which is perpendicular to the axial extension of the device the dividing elements are arranged with respect to each other at angles of the same value, e.g. four dividing elements and equal distant angles of 90 degrees.

In some embodiments, it might alternatively or in addition be provided that (i) the device comprises at least one second end section of conical form, such the second end section being the end section facing towards the fluid outlet and/or being the end section opposite of the first end section of the device, and/or (ii) the outer wall widens out conically at the second end section of the device.

If the device and/or the outer wall comprises a conical end section, the fluid flow can be injected more direct and more secure into the volume domain, such as into the volume part domains.

In some embodiments, it might alternatively or in addition be provided that the volume domain is designed in at least one cross sectional plane like a ring and/or at least one volume part domain is designed in the cross sectional plane like a section of a ring.

A ring-like volume domain represents a concentric arrangement of the device on the sleeve shaft which is particularly good for preventing imbalances to the sleeve shaft or to the glass drawing system.

In some embodiments, it might alternatively or in addition be provided that the device further comprises at least one inner wall, and the volume domain is enclosed at least in part between the outer wall and the inner wall, wherein the inner wall is or can be at least area by area in direct or indirect contact with the outer surface area of the sleeve shaft when the device is mounted at the sleeve shaft, wherein the inner wall may be at least in part arranged concentrically with the outer wall and/or the dividing elements are connected to the inner wall and/or are formed with the inner wall in one piece; and/or that the device further comprises at least one back wall, which limits the volume domain at least in part in axial direction, such as the back wall is connected at least in part with the outer wall, the inner wall and/or the dividing element.

An inner wall allows for a compact design of the device so that it can be installed on the sleeve shaft very comfortably. Furthermore, the inner wall might be designed so that it does not significantly conduct heat from the volume domain to the sleeve shaft. This ensures that the heat is dissipated by the fluid flow.

A concentric design can avoid imbalances in the system once the device is mounted at the sleeve shaft.

A back wall leads to high stability of the device and a properly defined volume domain.

If the dividing elements are connected to the inner wall or are formed with the inner wall in one piece, in which case the device is particularly robust. The same applies with respect to the back wall.

In some exemplary embodiments provided according to the present invention, a sleeve shaft includes the previously described device provided according to the present invention, which device is mounted on at least one outer surface area of the sleeve shaft. The outer surface area of the sleeve shaft to which the device is mounted may be covered in part or completely by at least one insulator, such as a fiber non-woven.

If a sleeve shaft is provided with a respective device, the advantages of the device as described previously can be applied without any further efforts.

In some embodiments, the sleeve shaft provided according to the present invention might be used in combination with the previously described method provided according to the present invention.

Providing the insulator allows for further improvement in that the heat is taken away with the fluid flow.

In some embodiments, it might alternatively or in addition be provided that the device extends in at least one axial direction across the sleeve shaft for a length of between 0.4 and 0.8 times of the sleeve shaft, such as in at least one end section of the sleeve shaft.

If the extension of the device across the sleeve shaft is chosen dependent on the length of the sleeve shaft, a particularly balanced system and appropriate cooling capability can be provided.

In some embodiments, the length is between 0.4 and 0.6 times of the sleeve shaft, between 0.5 and 0.7 times of the sleeve shaft and/or between 0.6 and 0.8 times of the sleeve shaft.

In some embodiments, alternatively or in addition the sleeve shaft has an axial extension of between 2 m and 4 m, such as between 2.3 m and 3.5 m, between 2.5 m and 3.5 m, between 2.8 m and 3.2 m, or between 2.3 m and 3.05 m.

In some exemplary embodiments provided according to the present invention, a refractory tube, such as for use in a glass tube drawing process or in the method provided according to the present invention, into which refractory tube a sleeve shaft provided according to the present invention is inserted, such as in a coaxial manner.

If a refractory tube is provided with a respective sleeve shaft, the advantages of the sleeve shaft as described previously can be applied without any further efforts.

In some embodiments, the refractory tube provided according to the present invention might be used in combination with the previously described method provided according to the present invention.

In some exemplary embodiments provided according to the present invention, a system includes a sleeve shaft provided according to the present invention and/or a refractory tube provided according to the present invention, and the system further includes at least one fluid outlet which is at a fixed position with respect to the rotatable sleeve shaft and/or refractory tube, wherein the system may be configured such that at least one fluid flow can be emitted by the fluid outlet in the direction towards at least one volume domain, which volume domain is enclosed at least in part between at least one outer surface area of the sleeve shaft and at least one inner surface area of the refractory tube, such as a device provided according to the present invention is mounted on the sleeve shaft and the volume domain is enclosed between an outer wall of the device and the outer surface area of the sleeve shaft.

The fluid outlet in combination with a volume domain rotating relative to the fluid outlet is a particularly efficient way to realize the alternating fluid flow, hence, supporting the heat dissipation from the sleeve shaft.

In some embodiments, the system provided according to the present invention might be used in combination with the previously described method provided according to the present invention.

Referring now to the drawings, FIG. 1 shows a perspective partial cut view of a refractory tube 1 provided according to the present invention.

A sleeve shaft 3 is inserted into the refractory tube 1 in a coaxial manner.

The sleeve shaft 3 comprises a device 5, which device 5 is mounted on at least one outer surface area 7 of the sleeve shaft 3.

The device 5 has an outer wall 9 which, when the device 5 is mounted on the sleeve shaft 3 (as it is the case for the situation in FIG. 1), has at least area by area at least one radial distance D from the outer surface area 7 of the sleeve shaft 3 and limits a volume domain 11 enclosed between the outer wall 9 and the outer surface area 7 of the sleeve shaft 3 at least in part radially outwards.

The device 5 further comprises multiple dividing elements 13 (three of which are visible in FIG. 1) arranged at least in part within the volume domain 11. The dividing elements 13 divide the volume domain 11 into a plurality of volume part domains 15, which volume part domains 15 are at least in part pairwise and/or area by area fluidly connected to each other within the volume domain 11.

Figure 2:
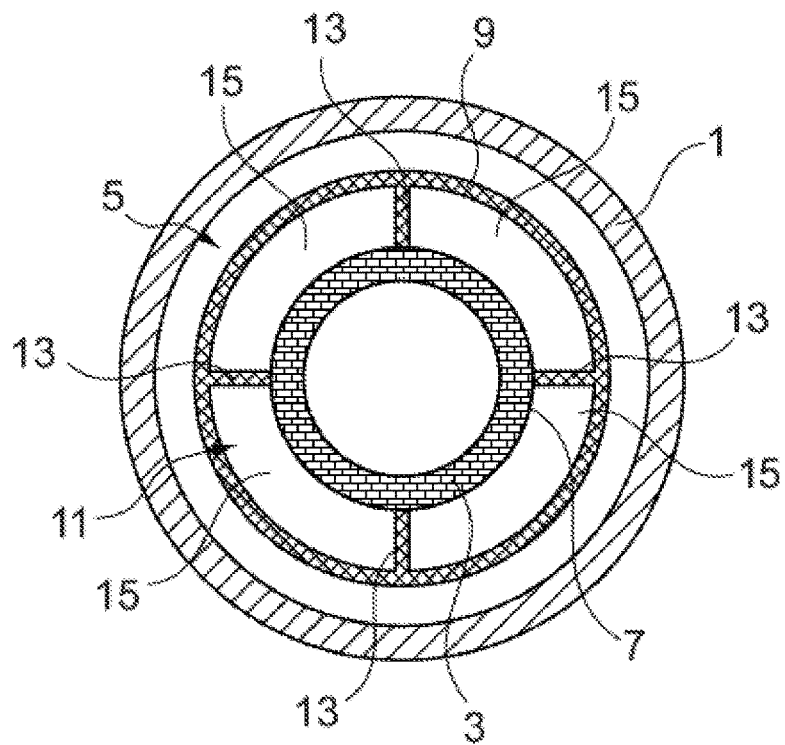
FIG. 2 illustrates a cross-sectional view of the refractory tube of FIG. 1.

FIG. 2 shows a cross-sectional view of the refractory tube 1 of FIG. 1 (along with the inserted sleeve shaft 3 and the mounted device 5). The cross-section shown in FIG. 2 lies within a plane perpendicular to the axial extension of the refractory tube 1 in FIG. 1.

The device 5 comprises four dividing elements 13, which are arranged along the inner circumference of the outer wall 9 in equal distant angles. I.e. the four dividing elements 13 are arranged at distances of 90 degrees with respect to each other around the inner circumference. To be more precise, in FIG. 2 the dividing elements 13 are shown at twelve o'clock (zero degrees), three o'clock (90 degrees), six o'clock (180 degrees) and nine o'clock (270 degrees).

The outer wall 9 is designed in one piece and is of hollow cylindrical shape. The dividing elements 13 extend into the volume domain 11 from the inner circumferential side of the outer wall 9. The dividing elements 13 have an angle of 90 degrees with the outer wall 9 and the dividing elements 13 are designed in one piece with the outer wall 9. Furthermore, the dividing elements 13 are arranged on the outer surface area 7 of the sleeve shaft 3 when the device 5 is mounted on the sleeve shaft 3, as can be taken from FIG. 2.

The device 5 is suitable for guiding at least one fluid along the outer surface area 7 of the sleeve shaft 3 which is used as a carrier for the refractory tube 1. The device 5 is arranged on the sleeve shaft 3 in a non-rotating manner.

If the sleeve shaft 3, hence, the device 5, hence volume domain 11, is rotating, a fluid outlet (not shown in FIGS. 1 and 2) fixedly arranged with respect to the rotating sleeve shaft 3 might inject a fluid flow subsequently in the individual volume part domains 15 due to the rotational movement of the sleeve shaft 3.

Figure 3:
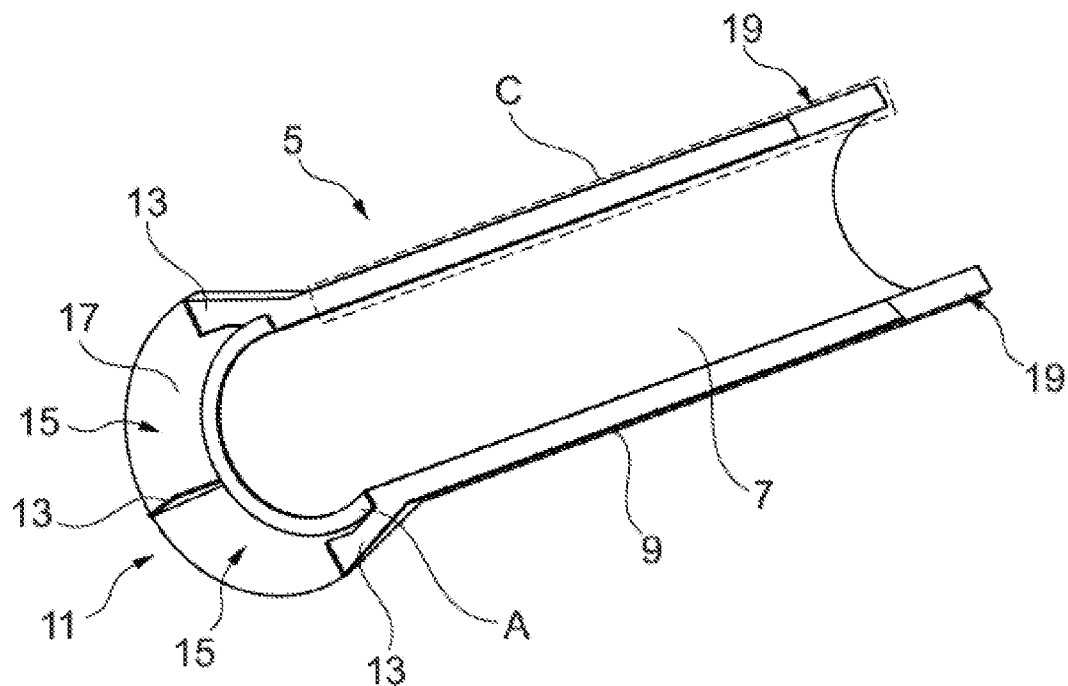
FIG. 3 illustrates a perspective cut view of the device shown in FIGS. 1 and 2.

FIG. 3 shows a perspective cut view of the device 5 which has already been described with reference to FIGS. 1 and 2. In FIG. 3 one half of the device 5 is shown across its entire axial extension. For the purpose of illustration, the sleeve shaft (such as sleeve shaft 3) is indicated by an arc segment A and the outer surface area 7.

The device 5 comprises an end section 17 of conical form. This end section 17 might be the one facing towards a possible fluid outlet (not shown in FIG. 3) so that the fluid flow can be efficiently guided towards the volume part domains 15.

At the end section of the device 5 opposing the end section 17, the dividing elements 13 are reduced in axially extension such that within the volume domain 11 multiple fluid overflow areas 19 for the fluid are provided. This way the fluid can flow from at least one first volume part domain 15 to at least one second volume part domain 15.

Just for the sake of illustration it is noted, that the cross-section C indicated in FIG. 3 by dashed lines is a cross-section of the volume domain 11. Since by definition the volume domain 11 is limited in a radial outwards direction by the outer wall 9, consequently, the volume domain 11 is not extending in the volume enclosed by the end section 17 of conical form. This is because in the exemplary embodiment of device 5, the end section 17 is comprised by the device 5 rather than by the outer wall 9.

The volume part domains 15 are fluidly connected to each other within the volume domain 11. This does not exclude that the volume part domains 15 might also be fluidly connected to each other via some connection outside of the volume domain 11.

The dividing elements 13 each comprise a metal sheet and are arranged at least in part within the volume domain 11. Indeed, the dividing elements 13 are also extending outside of the volume domain 11, e.g. in the volume enclosed by the end section 17.

The device might also comprise a back wall which, however, is not shown in FIG. 3. This back wall might limit the volume domain 11 in axial direction, especially near the fluid overflow areas 19.

Figure 4:
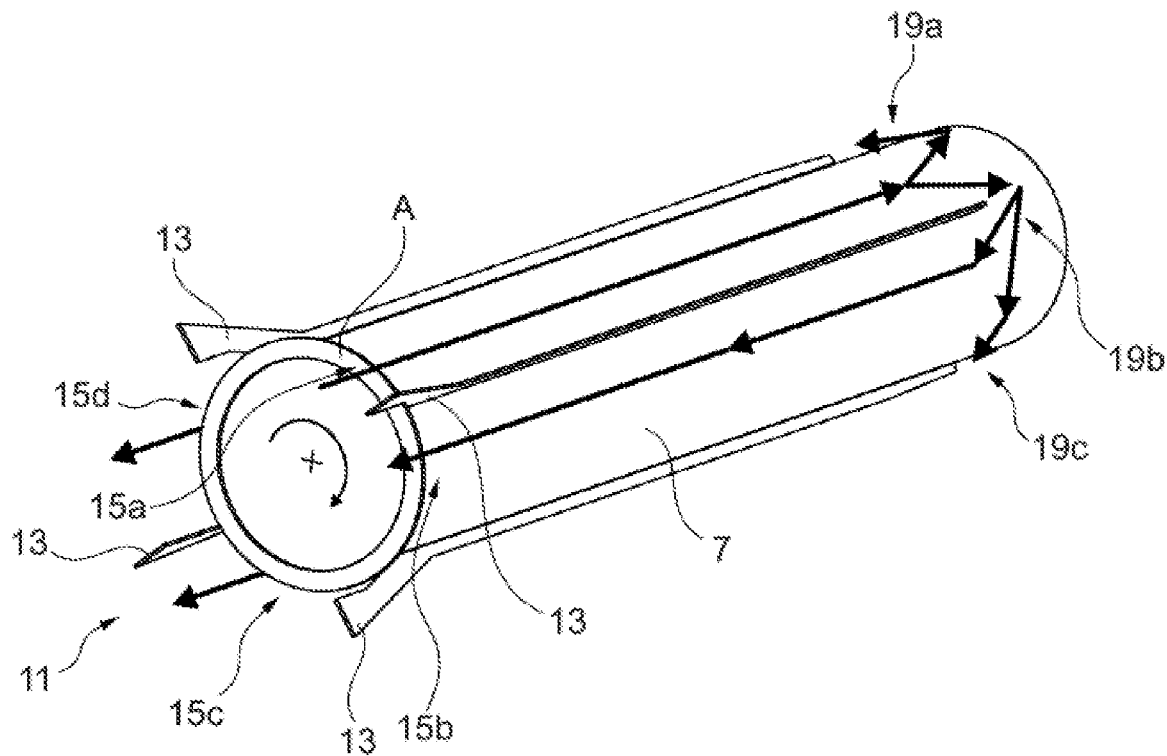
FIG. 4 illustrates a perspective view of parts of the device of FIG. 3.

FIG. 4 shows a perspective view of parts of the device 5 described with respect to FIG. 3. To be more precise, in FIG. 4 the dividing elements 13 are shown which provide the fluid overflow areas 19 within the volume domain 11. Again, also in FIG. 4 for the purpose of illustration the sleeve shaft (such as sleeve shaft 3) is indicated by arc segment A and the outer surface area 7.

For the sake of simplification of the description, the four volume part domains (above commonly referred to as volume part domains 15) are now individualized by volume part domains 15a to 15d and the four fluid overflow areas (above commonly referred to as fluid overflow areas 19) are now individualized by fluid overflow areas 19a to 19d (however, fluid overflow area 19d is not visible in FIG. 4 at all).

Between each two adjacent volume part domains 15a, 15b, 15c, 15d, a respective fluid overflow area 19a, 19b, 19c, 19d provides a fluid connection between the respective volume part domains 15a, 15b, 15c, 15d. Hence, at least a pairwise connection is obtained between the volume part domains 15a, 15b, 15c, 15d.

In FIG. 4 arrows are shown indicating the fluid flow directions for the situation that a fluid flow is injected into the volume part domain 15a. The fluid flow injected into the volume part domain 15a flows to the end section of the device 5 where the overflow areas 19a and 19b are provided. Here, a first part of the emitted fluid flow enters volume part domain 15b via fluid overflow area 19b and a second part of the emitted fluid flow enters volume part domain 15d via fluid overflow area 19a.

A first portion of the first part of the emitted fluid flow then flows back within the volume part domain 15b towards the other end section of the device 15. A second portion of the first part of the emitted fluid flow enters the volume part domain 15c via fluid overflow area 19c.

Likewise, a first portion of the second part of the emitted fluid flow then flows back within the volume part domain 15d towards the other end section of the device 15. A second portion of the second part of the emitted fluid flow enters the volume part domain 15c via fluid overflow area 19d (not shown in FIG. 4).

If the volume part domain 15a, 15b, 15c, 15d into which the fluid flow is emitted changes over time, a respective spatially and/or temporally alternating fluid flow is obtained within the volume domain 11. An exemplary realization might comprise, as indicated by the curved arrow in FIG. 4, that the device 5 is rotated mediated by a rotation of the sleeve shaft on which the device 5 is mounted, in combination with a relatively fixed fluid outlet.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Refractory tube
3 Sleeve shaft
5 Device
7 Area
9 Wall
11 Volume domain
13 Dividing element
15, 15a, 15b, 15c, 15d Volume part domain
17 End section
19, 19a, 19b, 19c, 19d Area
A Segment
C Cross section
D Distance

What is claimed is:

1. A system, comprising:
a refractory tube;
a sleeve shaft which is used as a carrier for the refractory tube, wherein during a glass tube drawing process molten glass runs onto a surface area of the refractory tube, the sleeve shaft comprising an outer surface area; and
a device for guiding a fluid along an outer surface area of the sleeve shaft which is used as the carrier for the refractory tube, wherein the device is arranged at least area by area at least one of on the sleeve shaft or in the refractory tube in a non-rotating manner, the device comprising:
an outer wall, which, when the device is mounted on the sleeve shaft, has at least area by area a radial distance from the outer surface area of the sleeve shaft and limits a volume domain enclosed between the outer wall and the outer surface area of the sleeve shaft at least in part radially outwards, the outer wall having a first axial end and a second axial end opposite the first axial end; and
a dividing element arranged at least in part within the volume domain, which divides the volume domain into a plurality of volume part domains, which volume part domains are at least in part at least one of pairwise or area by area fluidly connected to each other within the volume domain, wherein the outer wall has area by area a radial distance from the outer surface area of the sleeve shaft and limits the volume domain enclosed between the outer wall and the outer surface area of the sleeve shaft at least in part radially outward, wherein the dividing element extends from the first axial end to an overflow area adjacent to the second axial end.

2. The system of claim 1, wherein the outer wall is designed in one piece.

3. The system of claim 1, wherein the outer wall is at least in part of hollow cylindrical shape.

4. The system of claim 1, wherein the outer wall is built by a plurality of outer wall parts.

5. The system of claim 1, wherein the device is designed in a modular manner.

6. The system of claim 1, wherein the dividing element comprises a metal sheet which is arranged at least in part within the volume domain.

7. The system of claim 6, wherein the metal sheet extends in at least one of an axial direction or a radial direction within the volume domain.

8. The system of claim 1, wherein the dividing element extends into the volume domain from an inner circumferential side of the outer wall.

9. The system of claim 1, wherein the dividing element has an angle of 90 degrees with the outer wall.

10. The system of claim 1, wherein the dividing element is designed in one piece with the outer wall.

11. The system of claim 1, wherein the dividing element is arranged on the outer surface area of the sleeve shaft when the device is mounted on the sleeve shaft.

12. The system of claim 1, wherein the dividing element is reduced in at least one of axial extension or radial extension such that within the volume domain the overflow area is provided so that the fluid can flow from a first volume part domain to a second volume part domain.

13. The system of claim 1, wherein the dividing element comprises two dividing elements, which are arranged along an inner circumference of the outer wall in equal distant angles.

14. The system of claim 1, wherein at least one of the following is satisfied:
(i) the device comprises a second end section of conical form, the second end section being at least one of an end section facing towards a fluid outlet or an end section opposite of a first end section of the device; or
(ii) the outer wall widens out conically at the second end section of the device.

15. The system of claim 1, wherein at least one of the following is satisfied:
the volume domain is designed in a cross sectional plane like a ring; or
at least one of the volume part domains is designed in the cross sectional plane like a section of a ring.

16. The system of claim 1, wherein at least one of the following is satisfied:
the device further comprises an inner wall, and the volume domain is enclosed at least in part between the outer wall and the inner wall, wherein the inner wall is or can be at least area by area in direct or indirect contact with the outer surface area of the sleeve shaft when the device is mounted at the sleeve shaft; or
the device further comprises a back wall, which limits the volume domain at least in part in an axial direction.

17. The system of claim 1, wherein the outer surface area of the sleeve shaft to which the device is mounted is covered in part or completely by an insulator.

18. The system of claim 1, wherein the device extends in at least one axial direction across the sleeve shaft for a length of between 0.4 and 0.8 times of the sleeve shaft.

19. The system of claim 1, wherein the sleeve shaft is inserted into the refractory tube.

20. The system of claim 19, wherein the sleeve shaft is inserted into the refractory tube in a coaxial manner.

* * * * *